(12) United States Patent
Jeon et al.

(10) Patent No.: US 10,859,126 B2
(45) Date of Patent: Dec. 8, 2020

(54) MULTI-POSITION ROTARY ACTUATOR WITH CLUTCH

(71) Applicant: Dura Operating, LLC, Auburn Hills, MI (US)

(72) Inventors: Jinseok Jeon, LaSalle (CA); Aubrey J. Nofzinger, Rochester Hills, MI (US)

( * ) Notice: Subject to any disclaimer, the term of this patent is extended or adjusted under 35 U.S.C. 154(b) by 72 days.

(21) Appl. No.: 15/955,196

(22) Filed: Apr. 17, 2018

(65) Prior Publication Data

US 2019/0316640 A1 Oct. 17, 2019

(51) Int. Cl.
| F16D 41/066 | (2006.01) |
| F16H 1/28 | (2006.01) |
| F16H 27/08 | (2006.01) |
| F16D 41/10 | (2006.01) |
| F16H 63/34 | (2006.01) |
| F16H 57/08 | (2006.01) |

(52) U.S. Cl.
CPC .............. *F16D 41/066* (2013.01); *F16H 1/28* (2013.01); *F16H 57/08* (2013.01)

(58) Field of Classification Search
CPC .......... F16D 41/066; F16D 1/28; F16D 57/08; F16D 41/105; F16H 63/3491; F16H 63/3466
See application file for complete search history.

(56) References Cited

U.S. PATENT DOCUMENTS

| 2,001,668 | A | | 5/1935 | Maier | |
| 3,084,774 | A | * | 4/1963 | Liang | F16D 41/088 192/44 |
| 3,177,728 | A | * | 4/1965 | Farison | F02N 15/06 74/7 A |
| 3,788,151 | A | * | 1/1974 | Campau | F02N 15/06 74/7 A |
| 4,076,108 | A | | 2/1978 | Fogelberg | |
| 4,877,113 | A | * | 10/1989 | Taig | B60T 13/741 188/82.84 |
| 5,094,115 | A | * | 3/1992 | Michihira | B60K 37/06 74/335 |
| 5,103,950 | A | | 4/1992 | Ito et al. | |
| 5,518,462 | A | * | 5/1996 | Yach | F16H 37/041 251/129.11 |
| 6,125,586 | A | * | 10/2000 | Buscher | F16H 1/28 49/352 |
| 6,484,598 | B2 | * | 11/2002 | Peter | F16H 61/32 477/99 |
| 6,918,314 | B2 | * | 7/2005 | Wang | F16H 59/08 74/335 |

(Continued)

*Primary Examiner* — Tinh Dang
(74) *Attorney, Agent, or Firm* — Vivacqua Crane PLLC

(57) ABSTRACT

In at least some implementations, a multiple position actuator, includes a motor, a gearset driven by the motor, an output driven by the gearset between at least two positions, and a clutch arranged between the gearset and the output to permit relative rotation between the output and gearset. The gearset, output and clutch may be coaxially arranged. The clutch may include at least two movable elements that move relative to one or both of the output and gearset to permit relative rotation between the clutch and gearset in two opposed rotational directions. In at least some implementations, the gearset provides a torque to the output that is at least 50 times greater than the torque of the motor.

9 Claims, 5 Drawing Sheets

(56) References Cited

U.S. PATENT DOCUMENTS

| | | | |
|---|---|---|---|
| 7,241,244 B2* | 7/2007 | Wang | F16H 61/32 188/1.12 |
| 7,752,933 B2* | 7/2010 | Parsons | F16K 31/003 74/319 |
| 8,313,403 B2* | 11/2012 | Wilson, Jr. | A62B 1/10 475/149 |
| 9,447,845 B2* | 9/2016 | Jeon | F16H 1/003 |
| 9,970,543 B2* | 5/2018 | Jeon | F16H 19/02 |
| 2002/0045506 A1* | 4/2002 | Scheuerer | F16H 61/12 475/5 |
| 2016/0185383 A1* | 6/2016 | Fujita | B62D 5/046 180/444 |

* cited by examiner

MULTI-POSITION ROTARY ACTUATOR WITH CLUTCH

TECHNICAL FIELD

The present disclosure relates generally to a rotary actuator with a clutch.

BACKGROUND

Actuators may be used to rotate an output shaft and the output shaft may in turn displace or drive a device to change position (including angular position). Such actuators may be used to move a pawl relative to a gear between engaged and disengaged positions to selectively prevent and permit rotation of the gear.

SUMMARY

In at least some implementations, a multiple position actuator, includes a motor, a gearset driven by the motor, an output driven by the gearset between at least two positions, and a clutch arranged between the gearset and the output to permit relative rotation between the output and gearset. The gearset, output and clutch may be coaxially arranged. The clutch may include at least two movable elements that move relative to one or both of the output and gearset to permit relative rotation between the clutch and gearset in two opposed rotational directions. In at least some implementations, the gearset provides a torque to the output that is at least 50 times greater than the torque of the motor.

In at least some implementations, the output is driven by the motor from a first position to a second position, and a biasing member acts on the output to move or assist the movement of the output from the second position back to the first position. The output may be rotated and cause rotation of the gearset without actuation of the motor. The actuator may be arranged so that the gearset is an input of the clutch and the output is an output of the clutch.

In at least some implementations, the gearset includes a sun gear, a ring gear and multiple planet gears engaged with the ring gear, and the ring gear is coupled to the clutch and the output is coupled to the clutch. The ring gear may define at least one of a support surface or a clutch surface, and a gap between the support surface and clutch surface has a circumferentially oriented length and a varying width along the length, and the clutch may include a movable element engaged with both the support surface and clutch surface and a biasing member engaged with the movable element to yieldably bias the movable element toward a narrower portion of the gap. The clutch may include a clutch set with two opposed movable elements and the gap has a minimum width at a location between the two movable elements and the width of the gap increases from the location of minimum width toward each movable element of the set.

In at least some implementations, the clutch includes at least one movable member and at least one biasing member that yieldably biases the movable member into engagement with one or both of the output and a gear of the gearset. And the biasing member may support the movable member during backdrive rotation of the output which causes rotation of the gearset.

In at least some implementations, a multiple position actuator includes a motor, a gearset including multiple gears driven by the motor, wherein the gears are arranged to rotate about a common axis or parallel axes, an output driven by the gearset between at least two positions, and a clutch. The clutch is arranged between the gearset and the output to permit relative rotation between the output and gearset, the clutch including at least one movable element engageable with the output and with at least one of a gear of the gearset or a component that rotates with a gear of the gearset.

BRIEF DESCRIPTION OF THE DRAWINGS

The following detailed description of some implementations of a shifter will be set forth with regard to the accompanying drawings, in which.

DETAILED DESCRIPTION

Figure 1:
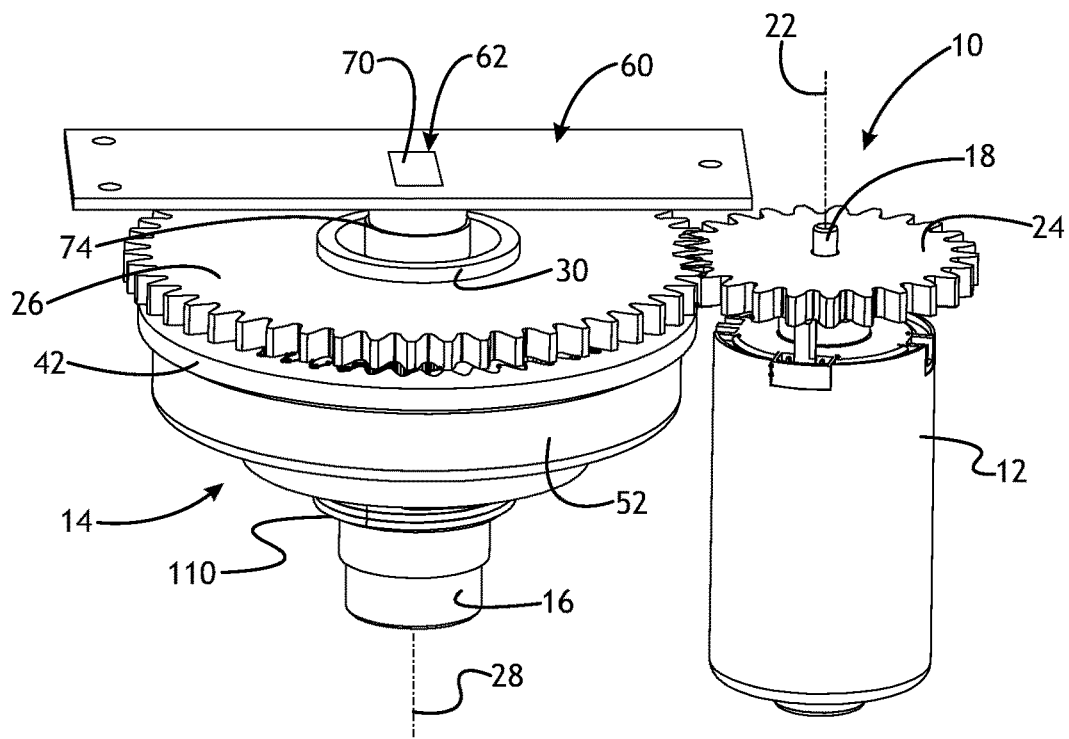
FIG. 1 is a perspective view of an actuator.
Figure 2:
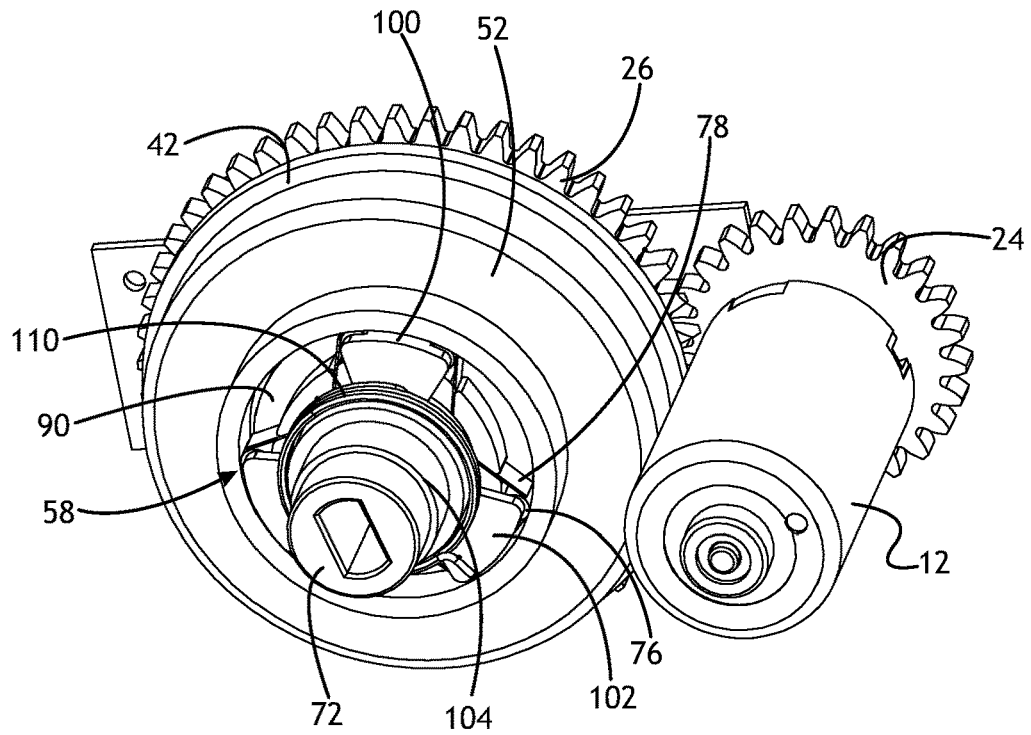
FIG. 2 is perspective view of the actuator and a clutch coupled to the actuator.
Figure 3:
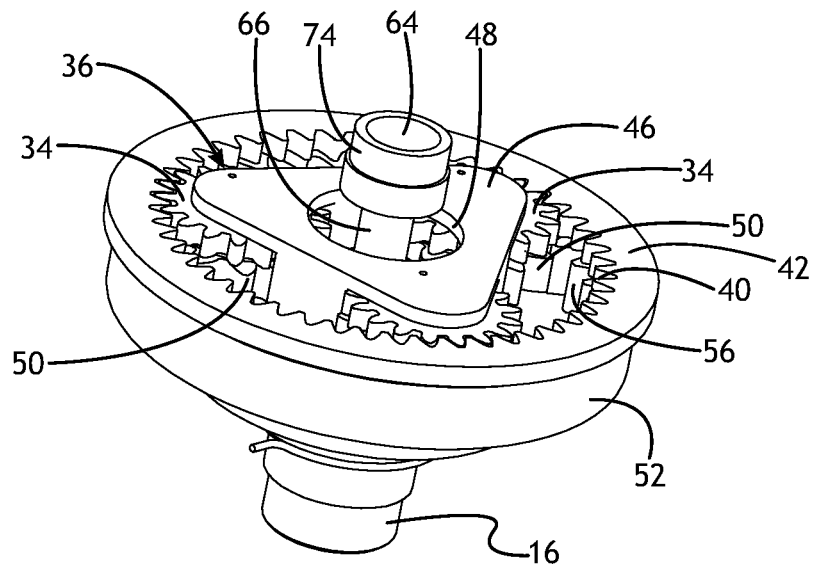
FIG. 3 is a perspective view of a gearset of the actuator.

Referring in more detail to the drawings, FIG. 1 illustrates an actuator that may be a rotary actuator 10 having a motor 12 that, through a gearset 14 (e.g. at least two meshed gears), drives an output 16 for rotation. The output 16 may be coupled, for example and without intending to limit this disclosure, to a park lock assembly 20 (FIG. 9) to change the state of the park lock assembly (i.e. locked or unlocked), or to an input shaft or lever of a shifting mechanism of an automotive vehicle transmission. In that example, rotation of the output 16 rotates the input shaft to shift the transmission from one gear to the next (e.g. from neutral to drive).

The motor 12 may be electrically driven and may include a drive shaft 18 that is driven for rotation about an axis 22. In at least some implementations, the motor 12 is a brushless motor 12 and hence, does not include a commutator and associated brushes and is instead a multi-phase, electrically commutated motor 12. A motor including brushes may be used, as desired. By way of non-limiting examples, the motor 12 may be a permanent magnet synchronous motor, asynchronous/induction motor or a switched reluctance motor.

The motor 12 drives the gearset 14 of the actuator 10. In the example shown, a drive gear 24 is coupled to the motor drive shaft 18 for co-rotation with the drive shaft as commanded by the motor. The drive gear 24 is shown as a spur gear but could be any desired type of gear, including but not limited to a bevel gear or worm gear. The drive gear 24 is meshed with and drives a driven gear 26 that is coupled to the gearset 14 as set forth in more detail below. The driven gear 26 may also be a spur gear, and may be larger than (e.g. have more teeth) the drive gear 24 providing a first stage of torque increase between the motor 12 and output 16 of the gearset 14. The driven gear 26 is rotated about an axis 28 that is parallel to and radially offset from the axis 22 of the motor 12 and drive gear 24. Of course, other arrangements may be used, as desired.

The gearset 14 may include a planetary gearset 14, and as shown in FIGS. 1-5, at least some implementations may include a compound planetary gearset 14. In at least some implementations, the gearset 14 increases the torque provided from the motor 12 to the output 16 and thus, a smaller, less expensive and lighter motor 12 may be used to drive the output 16 at a desired torque. Of course, other gears or gearsets may be used as desired.

The gearset 14 includes a sun gear 30 (FIG. 4) that is coupled to the driven gear 26 for co-rotation with the driven gear. In the example shown, the sun gear 30 is coaxial with the driven gear 26 and extends axially from the driven gear to align and mesh outwardly extending teeth 32 of the sun gear with teeth of multiple planet gears 34 of a first stage of the compound planetary gear set 14.

The first stage planet gears 34 may be mounted on posts (not shown) of a planet carrier 36, and in the implementation shown, there are three posts and three first stage planet gears 34. Each first stage planet gear 34 may include outwardly extending teeth 38 adapted to engage and be meshed with both the sun gear teeth 32 and teeth 40 of a first stage ring gear 42. Each first stage planet gear 34 may rotate about an axis 44 (FIG. 4) defined by its respective post and the first stage planet gears 34 may also rotate with the carrier 36 about its axis 28, which may be coaxially aligned with the sun gear 30 and driven gear. The planet carrier 36 may include axially spaced apart supports 46 to which the posts are coupled or engaged and axially between which the first stage planet gears 34 are received. A first support may include a central opening 48 (FIG. 3) through which the sun gear 30 extends.

As noted above, the first stage planet gears 34 are meshed with the first stage ring gear 42. The first stage ring gear 42 is annular and includes inwardly extending teeth 40 about a radially inner surface. The first stage ring gear 42 may be fixed to a housing or other support so that the ring gear does not rotate as the sun gear 30, first stage planet gears 34 and planet carrier 36 rotate when driven by the motor 12. Because the first stage ring gear 42 is fixed against rotation relative to the housing, the first stage ring gear 42 may, if desired, be formed integrally with the housing.

Figure 4:
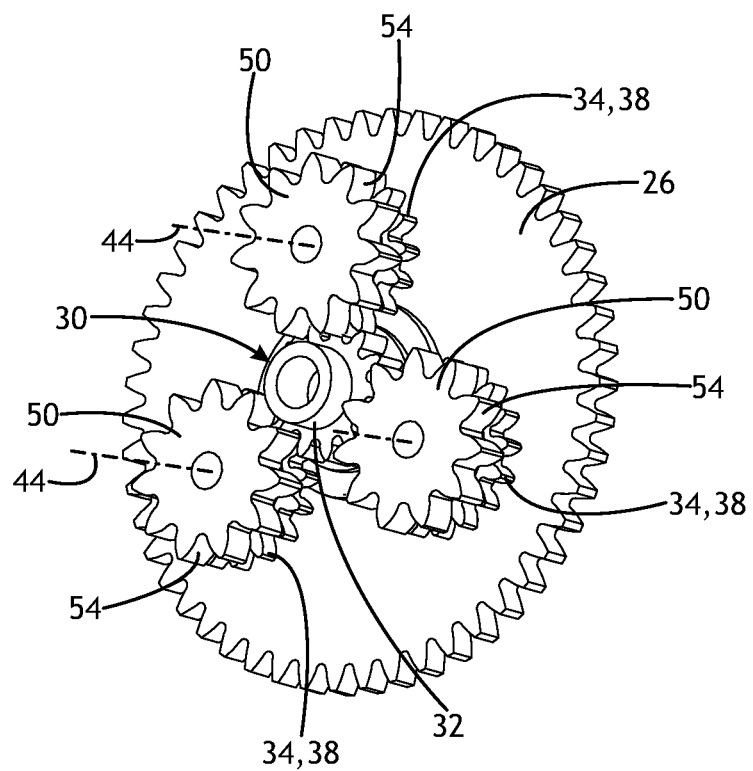
FIG. 4 is a perspective view of a driven gear, sun gear and planet gears of the gearset.
Figure 5:
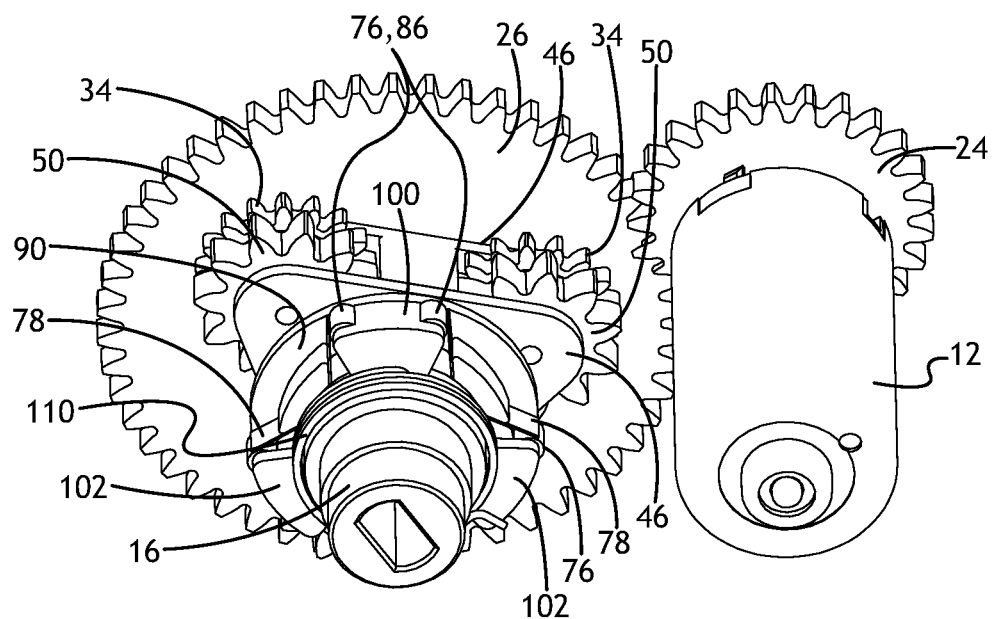
FIG. 5 is a perspective view of a portion of the actuator showing part of the gearset and clutch.

The compound gearset 14 also includes a second stage which is also a planetary gearset. The second stage includes one or more second stage planet gears 50 and a second stage ring gear 52 meshed with the second stage planet gears 50. Each of the second stage planet gears 50 is carried on a respective one of the posts of the planet carrier 36, axially spaced from a first stage planet gear 34 and axially aligned and meshed with the second stage ring gear 52. As shown in FIG. 4, the second stage planet gears 50 include outwardly extending teeth 54 meshed with inwardly extending teeth 56 (FIG. 3) of the second stage ring gear 52 so that the second stage planet gears 50 rotate relative to the planet carrier 36 about the posts and with the planet carrier 36 as the planet carrier 36 rotates relative to the second stage ring gear 52. The second stage ring gear 52 is driven for rotation about the axis 22 by the second stage planet gears 50 as the planet carrier 36 is rotated. In this compound gearset 14 arrangement, a second sun gear is not needed, and only one planet carrier 36 is needed—the planet carrier 36 is shared by both stages of gears. Among other possibilities, two separate planetary gearsets could be provided instead of the compound planetary gearset.

The output 16 is coupled to the second stage ring gear 52 by a clutch 58 so that the output 16 rotates with the second stage ring gear 52. The output 16 may be or include a stub shaft that may be coupled to the park lock assembly 20 or some other assembly to move a component of the assembly as the output 16 rotates. In the gearset 14 described herein, the sun gear 30 is the input and the output 16 is driven by the second stage ring gear 52. The torque flow path then flows from the motor 12 to the drive gear 24, to the driven gear 26, to an input of the gearset (e.g. the sun gear 30), to the first stage planet gears 34 and to the planet carrier 36, and from the planet carrier 36 to the second stage planet gears 50 and to an output gear (e.g. the second stage ring gear 52) which is coupled to the output 16 by the clutch 58. The torque may be increased by any desired amount between the motor 12/shaft 50 and the output 16. In at least some implementations, the torque at the output 16 may be between fifty (50) and five hundred (500) times greater than the torque at the rotor 22. The second stage ring gear 52 may be thicker (axially) and have stronger teeth than the first stage ring gear 42, for example, to handle the greater torque and forces on the second stage ring gear 52. In the compound gearset 14, the first stage ring gear 42 may have a different number and arrangement of teeth compared to the second stage ring gear 52 (e.g. different gear ratios). Correspondingly, the first stage planet gear teeth may be different from the second stage planet gear teeth so that the planet gears 34, 50 smoothly mesh with their respective ring gear 42, 52. In this way, the torque increase provided by the first stage 78 may be different than that provided by the second stage. Of course, the gear teeth could be the same, if desired. Further, while planetary gears are shown and described, the gearset 14 could include wobble gears, spur gears, bevel gears, combinations of such gears or other gearsets, as desired.

In at least some implementations, a circuit board 60 (FIG. 1) may be contained within a housing that also receives and retains the actuator 10. The circuit board 60 may include all or any desired number of the electrical components needed for operation of the actuator 10. Non-limiting examples of components that may be included on the circuit board 60 include power control circuitry for the motor 12, a controller for the motor 12 which may be or include a microprocessor that also manages other functions of the actuator 10 and possibly other vehicle components, and a position sensor 62 able to provide feedback about the rotational position of the motor 12, gearset 14, output 16 or any or all of these.

The position sensor 62 may be a non-contact type sensor, like a hall-effect sensor or a sensor wherein a conductive contact member engages a variable resistor. The contact member, which moves, can be carried by the movable component the position of which is to be monitored, and the variable resistor, which may be stationary, can be carried (e.g. printed or wired) on the circuit board. In the example shown, the position sensor 62 is used to monitor the rotary position of the output 16. While not required, directly detecting or sensing the position of the output 16 as opposed to the position of the rotor 22, shaft 50 or another gear in the gearset 14 can be more accurate because of tolerances and necessary lash or gaps between gears/gear teeth in the gearset 14 which cause the position of the output 16 relative to these other components to be somewhat variable.

Figure 7:
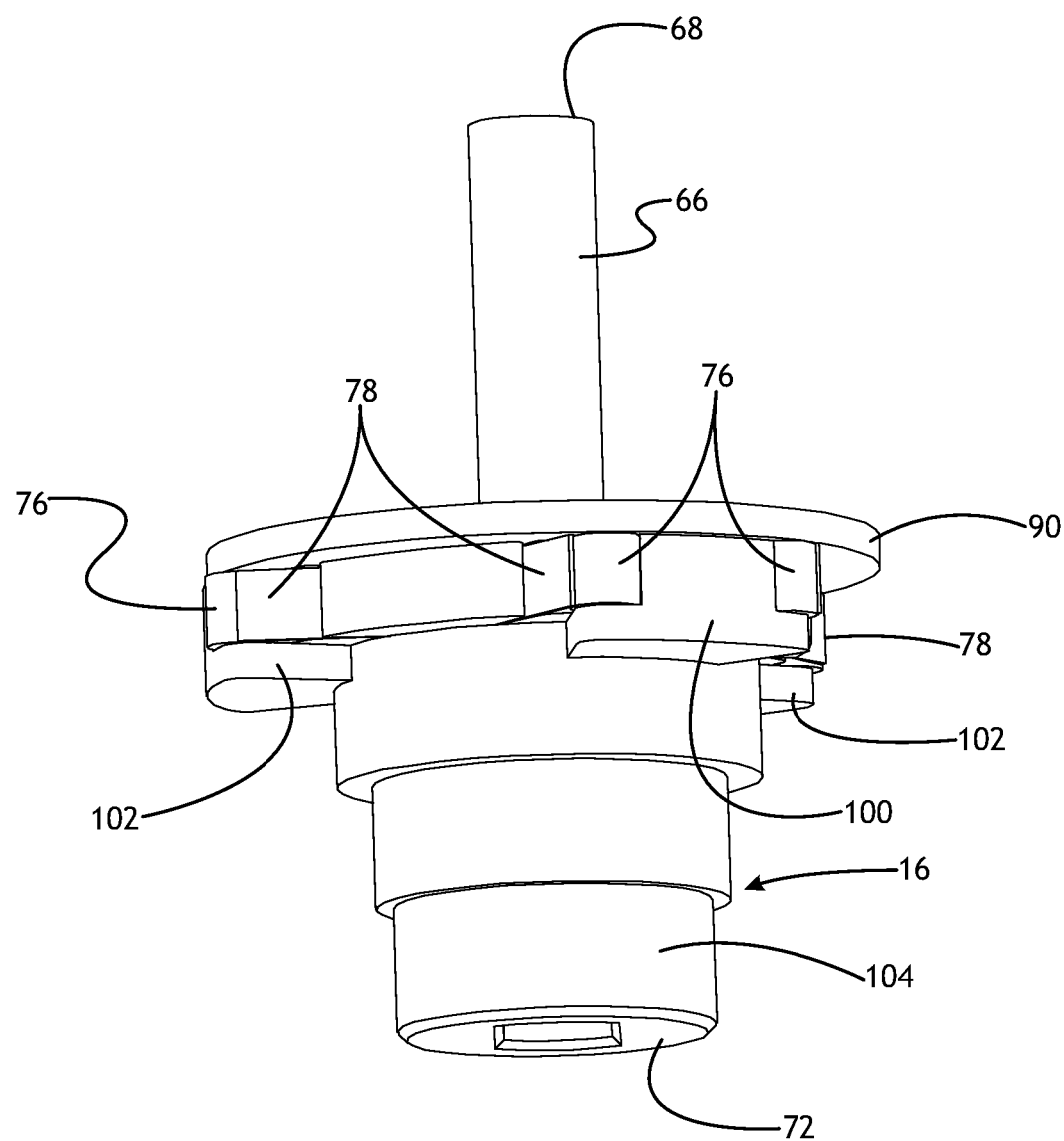
FIG. 7 is a perspective view of the output shaft and some clutch components.

Accordingly, in at least some implementations, the position sensor 62 is directly coupled to the output 16. In at least some implementations, a first member 64 (FIG. 3) of the position sensor 62 is fixed to an extension 66 of the output 16 for rotation with the output. The extension 66 may coaxially extend through the gearset 14, and may also extend through the driven gear 26 so that an end 68 (FIG. 7) of the extension is adjacent to the circuit board 60. A second member 70 (FIG. 1) of the position sensor 62, which is responsive to movement of the first member, is carried by the circuit board 60. The second member 70 could be located elsewhere in the actuator 10 and communicated with the processor or controller on the circuit board 60, if desired. The circuit board 60 could also be located in a different location so that the extension 66 is not necessary and the rotary sensor 62 may be positioned adjacent to the driving end 72 of the output 16.

In at least some implementations, the sensor 62 may be a hall-effect or other type of magnetic sensor wherein the first member 64 includes a magnet and the second member 70 includes a sensing device responsive to movement of the magnet. The magnet 64 may be retained on a magnet carrier 74 that is coupled to or part of the output extension 66. The magnet 64 may be circular or of any desired shape.

The output 16 may be driven by the motor 12 and gears in two opposed directions to provide at least two positions of the output, which may drive another component to and between at least two positions. In at least some implementations, the actuator 10 has two positions and the output 16 is rotated between the two positions. In the example of a park lock assembly 20, a first position of the output 16 may correspond to the locked state of the park lock assembly and the second position of the output may correspond to the unlocked state of the park lock assembly.

As noted above, the output 16 may be coupled to the gearset 14 via a clutch 58 to permit some relative rotation of the output gear 52 or output 16 relative to the other. In the example shown, the clutch 58 is a two-way clutch, that is, the clutch permits relative rotation between the output 16 and second stage ring gear 52 in both rotational directions. A one-way clutch, which permits relative rotation in only one direction, may also be used in at least some implementations.

In the implementation shown, the clutch 58 includes multiple movable elements 76 that are each engaged with and trapped between the second stage ring gear 52, the output 16 and at least one biasing member 78 that maintains the movable element engaged with the output and ring gear. In the example shown, the clutch 58 includes three evenly circumferentially spaced apart clutch sets 80 to balance the forces across the output 16, although only one clutch set or clutch needs to be provided. Each clutch set 80 includes two movable elements 76 and two biasing members 78 that each yieldably biases a respective one of the movable elements into a clutch surface 82 and an oppositely facing support surface 84 of the second stage ring gear 52. The movable elements 76 may move relative to one or both of the output 16 and the ring gear 52, and may slide or roll. In the example shown, the movable elements 76 are cylindrical rollers that have a round, circumferentially continuous rolling or engagement surface 86 engaged with the clutch and support surfaces 82, 84. Of course, other movable elements 76 may be used, including but not limited to spherical rollers or balls.

Figure 6:
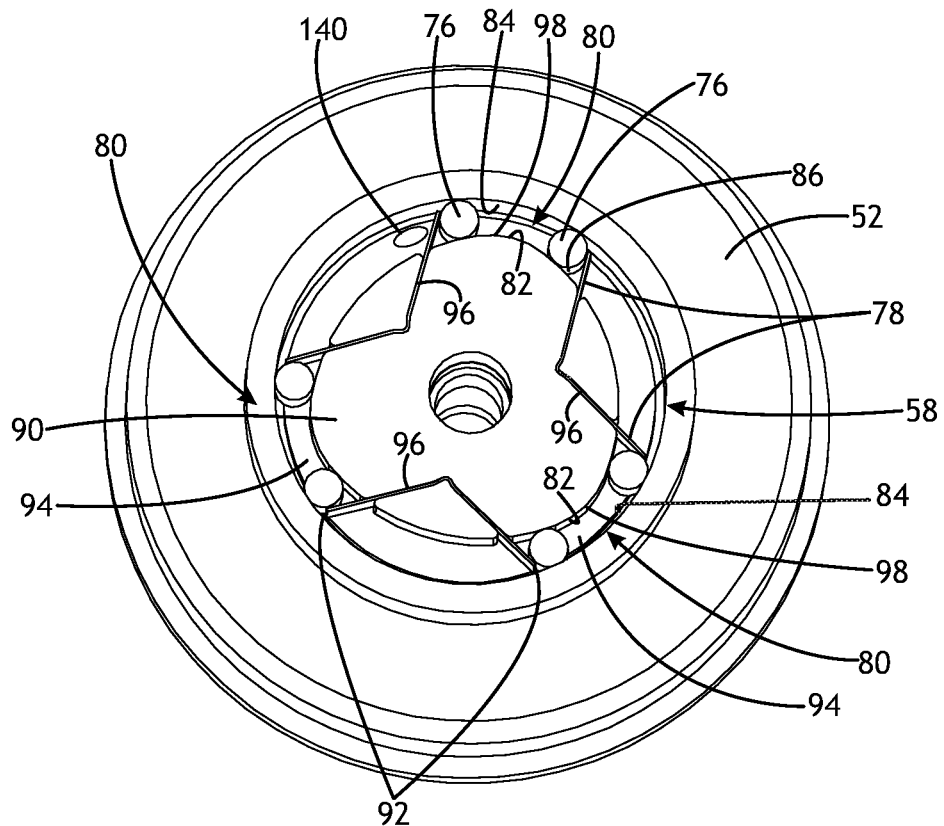
FIG. 6 is a bottom perspective view with an output shaft removed to show underlying portions of the clutch.
Figure 8:
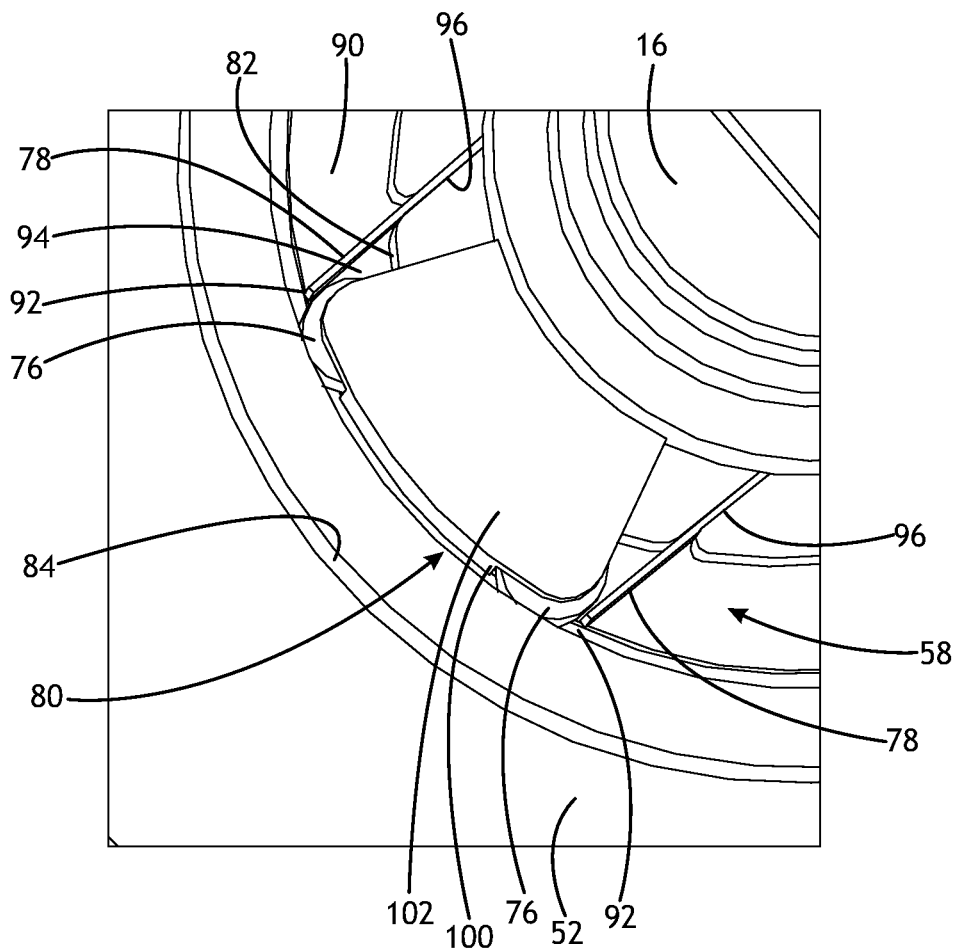
FIG. 8 is an enlarged view of a portion of the output shaft and clutch.

As shown in at least FIGS. 6 and 8, the biasing members 78 may be spring elements, may be coil springs or any other yieldable element, and are shown as flat pieces of metal that extend outwardly from a spring retainer 90 coupled to the second stage ring gear 52 for co-rotation with the ring gear 52. The spring retainer 90 may also define the clutch surface 82 which extends axially and circumferentially about a radial periphery of the spring retainer. In the example shown, the springs 78 are coupled to the spring retainer 90 and have free ends 92 that extend into a gap 94 between the clutch and support surfaces 84. One spring 78 may act on one movable element 76 in each of two adjacent clutch sets 80, as shown. In more detail, the spring 78 is trapped within a groove 96 in the spring retainer 90 and the opposed ends of the spring extend into circumferentially spaced apart locations of the gap 94. One spring 78 may also act on both movable elements 76 in a given clutch set 80, if desired, with each end of the spring 78 acting on a different one of the movable elements in a clutch set. Of course, other arrangements and numbers of springs may be used to yieldably bias the movable elements.

Either or both of the clutch and support surfaces 82, 84 is inclined or arranged at a varying radial distance from the axis of rotation 28 to provide a radial gap 94 of varying width between the surfaces. In the example shown, the support surface 84 is annular and does not vary radially while the clutch surface 82 varies radially. In more detail, the clutch surface 82 has a maximum radial extent at a location 98 between the two movable elements 76 in a clutch set 80 (e.g. at the midpoint) and a lesser radial extent in either direction away from the midpoint, and may be a mirror image about the midpoint or location of minimum gap width to provide equal forces in both directions of rotation. Thus, in this example, the radial gap 94 between the support surface 84 and clutch surface 82 is smallest at the location 98, may be less than the diameter of the rollers 76 and may increase uniformly in both directions from the location of minimum gap width. And the biasing members 78 urge the rollers 76 toward the location of minimum gap width, or a narrower portion of the gap, to urge the rollers to a smaller portion of the gap 94 so that the rollers remain engaged with both the clutch and support surfaces 82, 84 in the nominal or at rest position.

The output 16 may include one or more drive surfaces 100 that are coupled to the clutch 58 so that the output is driven for rotation by the second stage ring gear 52 through the clutch. In at least some implementations, each drive surface 100 engages or is engaged by the rollers 76 in a respective one of the clutch sets 80. The drive surfaces 100 are shown as axially extending surfaces received in the gap 94 between the clutch and support surfaces 82, 84 and having a circumferential extent received between the rollers 76 in each clutch set 80. Thus, in the example shown in the drawings, the output 16 includes three drive surfaces 100, which may be at the radial periphery of flanges 102 that extend radially from a center or central post 104 of the output 16. The output 16 (e.g. the flanges 102) may axially overlie the rollers 76 axially retain or trap the rollers between the output and either or both the spring retainer 90 and the second stage ring gear 52. The movable elements or rollers 76 may thus be engaged with the output (e.g. via the drive surfaces 100) and with at least one of a gear of the gearset (e.g. ring gear 52) or a component that rotates with a gear of the gearset (e.g. a housing that rotates with ring gear 52, where the housing may be formed integrally with or be coupled to the ring gear).

During operation, the rotation of the second stage ring gear 52 is transmitted to the output via the movable elements 76 that are engaged with the output drive surfaces 100, the clutch surface 82 of the spring retainer 90 and the support surface 94 of ring gear 52. The biasing members 78 maintain the movable elements 76 in contact with both the clutch and support surfaces 82, 84, one movable element 76 in each set (dependent upon direction of rotation) frictionally rolls toward a narrower portion of the gap 94 to rotationally couple the output 16 and ring gear 52, and the output and ring gear co-rotate without any or with minimal relative rotation so that the output is rotated by the gear set 14. One of the biasing members 78 in each set is flexed which permits some relative rotation of the output 16 and ring gear 52. That is, the movable element 76 engaged by the flexed biasing member 78 is permitted to move toward a radially wider portion of the gap 94 between the clutch and support surfaces 82, 84 which reduces the force transmission between the ring gear 52 and the output 16 and permits the output to rotate relative to the ring gear. In the example of a two-way clutch 58, this can happen in either direction. When the force is reduced, the biasing member 78 will resiliently return to or toward its unflexed or less flexed state and the position of the movable elements 76 will return to the starting position (relative to the gap 94 and surfaces 82, 84) with more direct force and rotation transfer between the ring gear 52 and the output 16.

In addition to the motor 12 and gearset 14, the output 16 may be yieldably biased to or toward a first position by a biasing member 110 which may be a spring. In the example of a park lock assembly 20, the first position of the output 16 may correspond to the locked state of the park lock assembly. In this way, if power is lost in the vehicle, the output 16 may be rotated to or held in the first position to move to or retain the park lock assembly in the locked state. The spring 110 may also help to maintain the locked state of the park lock assembly even when power is available to the motor 12, to inhibit unintended disengagement of the park mechanism (e.g. if the vehicle is bumped or pushed such that the park lock mechanism might otherwise disengage). In at least some implementations, the biasing member is a torsion spring 110 that has a first end engaged with the output 16 and a second end engaged with a housing or other structure. When the actuator 10 is moved to a second position, the force in the torsion spring 110 is increased to bias the output 16 to or toward the first position. Of course, other clutch mechanisms may be used between the gear set and the output to permit relative rotation between the gearset and output in at least some circumstances.

Figure 9:
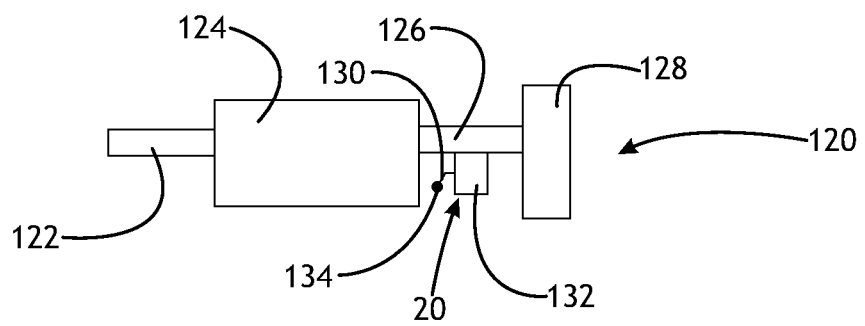
FIG. 9 is a diagrammatic view of a power transmission assembly including a park lock assembly and an actuator for the park lock assembly.

In some implementations, as noted above, the output 16 may be coupled to a park lock assembly 20 which may be arranged as shown in FIG. 9. FIG. 9 also illustrates a vehicle power transmission assembly 120 that includes an input shaft 122, a transmission 124 and an output shaft 126. The power transmission assembly 120 may be part of an electric vehicle powertrain, such as a so-called e-axle that may include an electric motor, one or more gears with the output shaft 126 coupled to the gear(s). The output shaft 126 may also be coupled to a vehicle wheel 128 to drive the wheel for rotation. When the vehicle is parked, it may be desirable to provide the park lock assembly 20 to, in at least some implementations, lock the axle or some other component of the transmission (e.g. the output shaft 126) against rotation, to prevent or at least substantially inhibit rotation of the wheels of the vehicle. In at least some implementations, the park lock assembly 20 is associated with and operable to selectively prevent rotation of the output shaft 126. The park lock assembly 20 may be located downstream of the transmission 124 and any gear(s), if desired.

As noted above, an actuator may be provided to drive the park lock assembly between locked and unlocked positions (e.g. by engaging a pawl or other lock member 130 with a lock body 132 coupled to a rotating part (e.g. gear or shaft) of the power transmission assembly 120). The pawl 130 may rotate about a pivot 134 and be yieldably biased to the locked position, the output 16 may be yieldably biased to the locked position or both. Relatively high forces may be needed to move the lock assembly 20 from the locked position, for example, with a park lock assembly in a vehicle, the weight of the vehicle when parked on an incline may be transmitted onto the pawl to some extent. Thus, a relatively high torque may be needed to move the output 16 to move the pawl 130 from the locked position. In at least some implementations, the gearset 14 provides a torque increase from the motor 12 to increase the torque provided to the output.

The clutch may also permit the actuator to be backdriven (i.e. the output rotated by a downstream component coupled to the output such as the park lock assembly), or by the spring 110, and the clutch may permit the output to be backdriven with a relative low torque. The spring(s) 78 may support the backdrive torque and thus should be stiff enough to permit the backdrive rotation as described. In at least some implementations a stop surface or support (one such stop surface or support is diagrammatically shown at 140 in FIG. 6, of course, additional supports may be provided by other springs as desired) may be provided to limit the deflection of the springs 78 during backdriving of the actuator. This permits, for example, the park lock assembly to be released even if the motor 12 fails, loses power or is otherwise not actuated. This in turn permits the vehicle to be shifted out of park to facilitate towing the vehicle. The clutch 58 may act in either or both directions (e.g., in a park lock assembly, when locking or unlocking the assembly) to permit the output to slip or to rotate relative to the gearset in either direction. Or, if the motor/gearset is only used to drive the output in one direction and a spring or other device is used to drive the output in the other direction, then a one-way clutch may be sufficient in at least some implementations. The gearset, clutch 58 and output may be coaxially arranged. The motor/gearset could be used to control the rate of any spring actuation of the actuator by acting as a brake or controller to reduce velocity of such action and any impact force and noise associated therewith. Further, the actuator could use a pulse width modulated drive current to reduce wasted energy to the motor 12 when not needed. For example, the motor may be driven at a reduced duty cycle to hold the actuator in either (or any) position, that is, to prevent or inhibit rotation of the output rather than to actively drive or rotate the output between positions which may require a higher duty cycle.

In at least some implementations, the output of the gearset is the input to the clutch, and the output of the clutch is the output used to drive a downstream component or system. During a backdrive movement of the output, the output becomes the clutch input and the gearset (e.g the second ring gear 52 in the illustrated example) is the clutch output. In at least some implementations, to facilitate backdriving of the actuator, the gears in the gearset may be coaxial or arranged to rotate about parallel axes, as is shown in the illustrated example. Worm gears or other gears that rotate about an axis not parallel with an adjacent meshed gear may be used, but may be more difficult to backdrive, may be more expensive if made to be backdriveable.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:
1. A multiple position actuator, comprising:
 a motor;
 a gearset driven by the motor;
 an output driven by the gearset between at least two positions; and a clutch arranged between the gearset and the output to permit relative rotation between the output and gearset, wherein the gearset includes a sun gear, a ring gear and multiple planet gears engaged with the ring gear, wherein the ring gear is coupled to the clutch and the output is coupled to the clutch, and wherein the ring gear defines a support surface and a clutch surface, and a gap between the support surface and the clutch surface has a circumferentially oriented length and a varying width along the length, and wherein the clutch includes a movable element engaged with both the support surface and clutch surface and a biasing member engaged with the movable element to yieldably bias the movable element toward a narrower portion of the gap.

2. The actuator of claim 1 wherein the gearset, output and clutch are coaxially arranged.

3. The actuator of claim 1 wherein the clutch includes at least two movable elements that move relative to one or both of the output and gearset to permit relative rotation between the clutch and gearset in two opposed rotational directions.

4. The actuator of claim 1 wherein the gearset provides a torque to the output that is at least 50 times greater than the torque of the motor.

5. The actuator of claim 1 wherein the output is driven by the motor from a first position to a second position, and a biasing member acts on the output to move or assist the movement of the output from the second position back to the first position.

6. The actuator of claim 1 wherein rotation of the output may cause rotation of the gearset without actuation of the motor.

7. The actuator of claim 1 wherein the gearset is an input of the clutch and the output is an output of the clutch.

8. The actuator of claim 1 wherein the clutch includes a clutch set with two opposed movable elements and the gap has a minimum width at a location between the two movable elements and the width of the gap increases from the location of minimum width toward each movable element of the set.

9. The actuator of claim 1 wherein the clutch includes at least one movable member and at least one biasing member that yieldably biases the movable member into engagement with one or both of the output and a gear of the gearset, and wherein the biasing member supports the movable member during backdrive rotation of the output which causes rotation of the gearset.

* * * * *